United States Patent Office 3,334,147
Patented Aug. 1, 1967

3,334,147
DEFOAMING AND SURFACE ACTIVE
COMPOSITIONS
Thomas E. Brunelle, St. Paul, Larry M. Rue, South St.
Paul, and Samuel B. Crecelius, St. Paul, Minn., assignors to Economics Laboratory, Inc., St. Paul, Minn., a corporation of Delaware
No Drawing. Filed Feb. 28, 1962, Ser. No. 176,447
3 Claims. (Cl. 260—611)

This invention relates to novel compounds having outstanding defoaming and surface active properties.

In recent years the use of defoaming agents comprising polyoxyalkylene compounds in detergents used for various cleaning operations has become widespread. These materials function to defoam the foam caused by food soil, and also act as surfactants to aid in detergency. By reducing foam the pressure of the water in the pumping system is increased, thereby considerably enhancing the cleaning efficiency of the washing system.

A serious disadvantage of the known polyoxyalkylene surfactant-defoaming agents generally used in detergent formulations is that in the presence of light metal hydroxides they rapidly lose their ability to defoam. A number of industrial cleaning operations particularly in the dairy industry, require the use of highly caustic detergents and the usefulness of the known polyoxyalkylene defoamers in such detergents is seriously limited due to the unstable nature of the defoamers. Very frequently, these known defoaming agents when used in highly caustic detergents lose their defoaming properties after one or two weeks storage.

It is therefore a major object of this invention to provide novel materials having surface active and defoaming properties which retain these properties for extended periods of time in the presence of caustic materials such as sodium hydroxide and the like.

It is another major object of the invention to provide a process for producing the novel surface active defoaming agents encompassed by the invention.

The novel surface active and defoaming agents of the present invention which may be characterized as caustic-stable are benzyl ethers of certain polyoxyalkylene polymers. The new compounds can be represented by the following generic formula: (A)

$$\text{C}_6\text{H}_5\text{-CH}_2\text{-O(CH}_2\text{CH-O)}_x\text{-(CH}_2\text{CH}_2\text{-O)}_y\text{-(CH}_2\text{CH-O)}_x\text{-(CH}_2\text{CH}_2\text{-O)}_y\text{-(CH}_2\text{CH-O)}_x\text{-CH}_2\text{-C}_6\text{H}_5$$
$$\qquad\qquad\qquad\quad\text{CH}_3 \qquad\qquad\qquad\qquad\quad \text{CH}_3 \qquad\qquad\qquad\qquad\quad \text{CH}_3$$

where:

$x$ is an integer of such value that the number of oxypropylene groups defined thereby constitutes from about 27 to about 33 percent by weight of the compound;
$y$ is an integer of such value that the number of oxyethylene groups defined thereby constitutes from about 31 to about 41 percent by weight of the compound;
$z$ is an integer of such value that the number of oxypropylene groups defined thereby constitutes from about 27 to about 36 percent by weight of the compound.

The values of $x$, $y$ and $z$ being such that the average molecular weight of the compound ranges from about 3800 to about 4700.

The above caustic stable surface active and defoaming compounds are produced in accordance with the invention by reacting sodium with a base polyoxyalkylene polymer having the formula: (B)

$$\text{HO-(CH}_2\text{CH-O)}_x\text{-(CH}_2\text{CH}_2\text{O)}_y\text{-(CH}_2\text{CH-O)}_x\text{-(CH}_2\text{CH}_2\text{O)}_y\text{-(CH}_2\text{CH-O)}_x\text{-H}$$
$$\qquad\qquad\text{CH}_3 \qquad\qquad\qquad\qquad\quad \text{CH}_3 \qquad\qquad\qquad\qquad\quad \text{CH}_3$$

where $x$, $y$ and $z$ are defined as in Formula A above. The polyoxyalkylene base polymer of Formula B is commercially available from the Tretolite Company of St. Louis, Mo., under the designation of product E–97 and has the following chemical and physical characteristics:

Cloud point: 33°–34° C.
Refractive index: 1.4555
Hydroxyl value: 28.9 mg. KOH/g. sample
Specific gravity: 1.038–1.041
Average molcular weight: 3600–4400

The compound E–97 is a specific example of the type compounds illustrated in Formula B in which:

$x$=32.8% by weight of the total molecular weight
$y$=32.6% by weight of the total molecular weight
$z$=34.4% by weight of the total molecular weight One mole equivalent of the above base compound of Formula B is reacted with two mole equivalents of sodium by adding molten metallic sodium to the base compound and heating the mixture with agitation, at a temperature from about 80° C. to 146° C. for a period ranging from two to twenty-four hours. The product of this reaction is a sodium alkoxide having the general formula: (C)

$$\text{Na-O-(CH}_2\text{CHO)}_x\text{-(CH}_2\text{CH}_2\text{O)}_y\text{-(CH}_2\text{CHO)}_x\text{-(CH}_2\text{CH}_2\text{O)}_y\text{-(CH}_2\text{CHO)}_x\text{-Na}$$
$$\qquad\qquad\text{CH}_3 \qquad\qquad\qquad\qquad\quad \text{CH}_3 \qquad\qquad\qquad\qquad\quad \text{CH}_3$$

where $x$, $y$ and $z$ are defined as in Formula A above.

One mole equivalent of the above intermediate (Formula C) is then reacted with two mole equivalents of benzyl chloride or bromide for a period from about 45 minutes to three hours at a temperature ranging from 100° C. to 145° C. The products of this reaction are the novel surface active and defoaming compounds of the invention (Formula A) and a by-product sodium chloride which may be removed, if desired, by filtration.

The preparation of the novel surface active-defoaming compounds of the invention is illustrated by the following specific examples which are illustrative in nature and not limitative of the invention.

EXAMPLE I

Approximately 198 grams of a polyoxyalkylene polymer corresponding to Formula B were weighed into a 500 ml. glass reaction flask fitted with a thermometer, gas inlet tube and heating mantel. The average molecular weight of this liquid polyoxyalkylene base compound as determined by hydroxyl number was 3960. The base compound was heated to a temperature of 100° C., after which approximately 2.3 grams of metallic sodium (0.1 mole) were slowly added thereto while nitrogen gas was passed through the solution. The addition of the metallic sodium was completed in 2¾ hours and the mixture was then stirred for an additional ½ hour. During this entire period the temperature was maintained between about 100°–120° C. The passage of nitrogen gas through the solution was terminated and about 12.66 grams (0.1 mole) of benzyl chloride was added by means of a dropping funnel. Addition of the benzyl chloride took approximately 1 hour 35 minutes, during which time the temperature was maintained at about 100°–120° C. Nitrogen gas was then passed through the solution for an additional ½ hour. The final benzyl ether product as illustrated in Formula A was a viscous liquid of tan color, having an average molecular weight of 4213.

EXAMPLE II

Approximately 180 grams of a polyoxyalkylene polymer corresponding to Formula B were charged into a 500 ml. flask equipped with stirrer, gas inlet tube, heater and dropping funnel. The average molecular weight of this polyoxyalkylene base compound as determined by hydroxyl number was 3600. The base compound was heated to 100° C. and, while passing the inert gas nitrogen through the solution, approximately 2.3 grams of metallic sodium (0.1 mole) were added slowly thereto over a period of 1 hour. The mixture was then stirred for an additional 1½ hour. Approximately 12.7 grams of benzyl chloride were then added dropwise over a period of ¾ of an hour. The solution was stirred for an additional ½ hour without passing nitrogen gas therethrough, and another ½ hour while passing nitrogen gas therethrough. The final benzyl ether product was a light brown viscous liquid having an average molecular weight of 3853.

EXAMPLE III

Approximately 449 pounds of the base polyoxyalkylene compound utilized in Example I were charged into a standard 100 gallon stainless steel reaction vessel and heated to 135°–140° C. while flushing with an inert gas. Approximately 5 pounds of metallic sodium were then added over a period of 10 minutes. The sodium metal remained in contact with the base polyoxyalkylene compound for approximately 23 hours during which time the temperature of the reaction mixture ranged from 80°–146° C. After the sodium had reacted with the base compound approximately 27.7 pounds of benzyl chloride were added to the mixture over a period of about 3 hours while maintaining the temperature between 100°–145° C. Approximately 480 pounds of the benzyl ether product were obtained.

EXAMPLE IV

Approximately 2050 grams of a base polyoxyalkylene corresponding to Formula B, having an average molecular weight of 4100 as determined by hydroxyl number were weighed into a 4 liter flask equipped with a gas inlet tube below the liquid surface, a pyrometer thermowell, and a stainless steel vane type stirrer. The base compound was heated to 145° C. while passing nitrogen gas through the liquid. When this temperature had been reached, 23.0 grams of metallic sodium were added accompanied by agitation and dispersed throughout the liquid base compound. After mixing 3½ hours at a temperature ranging between 135°–140° C., the reaction of the sodium was complete. At this point, 126.6 grams of benzyl chloride were added dropwise over a period of 1¼ hours while maintaining the temperature between 135°–140° C. Upon completion of the benzyl chloride addition, the mixture was mixed for an additional 45 minutes, to complete the reaction. Approximately 2176 grams of the benzyl ether product were obtained.

Throughout this application unless otherwise specified it will be understood that molecular weights are determined by hydroxyl number.

The chemical and physical characteristics of the compounds of this invention and the base compound from which they are prepared are tabulated in Table I.

TABLE I

| Example No. | Cloud Point, 1.0 gm./100 ml. H₂O., ° C. | Hydroxyl No. Mg. KOH/gm. sample | Index of Refraction at 25° C. | Extinction Coefficient l./gm., cm. CCl₄ Solution, 3,500 cm. | Hydroxyl Equivalent Millimoles, OH/gm. sample |
|---|---|---|---|---|---|
| Average Base Compound Corresponding to Formula B | 33–34 | 28.9 | 1.4555 | 0.0290 | 0.50 |
| Product of Example I | 19–20 | 6.4 | 1.4612 | 0.0194 | 0.35 |
| Product of Example II | 17–18 | 4.4 | 1.4621 | 0.0085 | 0.15 |
| Product of Example III | 20 | 9.1 | 1.4626 | 0.0102 | 0.18 |
| Product of Example IV | 18–19 | 5.9 | 1.4633 | 0.0074 | 0.13 |

With reference to the above Table I, cloud point data can be utilized as an indication of the extent of reaction of the base compound (Formula B). The cloud point determination is run by weighing a 1.0 gram sample of the compound into a beaker and then adding 100 milliliters of water. The compound is put into solution by stirring and cooling to a temperature below the cloud point. Once into solution, the material is then heated slowly with stirring until the cloudiness is dense enough to prevent reading newspaper print through it clearly. The temperature is recorded at the point where it is no longer possible to read the print and this temperature is referred to as the cloud point. As reaction of the base compound progresses, the cloud points become lower and in general reduction of the cloud point to a value of about 20° C. indicates that the base compound has undergone substantially complete reaction to form the desired benzyl ether product.

The hydroxyl number defined as milligrams of potassium hydroxide per gram of sample, also indicates the extent of reaction of the base compound. The hydroxyl number determination is made by reacting the hydroxyl groups of the compound with phthalic anhydride and determining the equivalent that reacted by running a blank determination and titrating both the blank and the sample with alkaline hydroxide. This value is then converted to the appropriate units of the definition.

The extinction coefficients are determined by making up a known weight solution of the defoamer with analytical grade carbon tetrachloride. The concentration is then expressed in grams/liter. An infrared spectra is then run on a Perkin Elmer Infrared #137 Spectrophotometer using the compensation beam and a matched sodium chloride fixed thickness cell filled with analytical grade carbon tetrachloride to wash out the absorption due to the solvent. The sample solution is placed in a fixed thickness cell of sodium chloride which is matched with the compensation cell and placed in the reference beam. The infrared spectrum is then scanned from between 4000–

2000 cm.$^{-1}$ in wave numbers. The characteristic absorption for the hydroxyl group appears between 3600–3400 cm.$^{-1}$, and for the caustic stable defoamers this absorption is found at 3500 cm.$^{-1}$. The depth of this transmittance peak is measured by first drawing a line tangent to the hydroxyl transmittance curve at approximately 3345 cm.$^{-1}$ and 3700 cm.$^{-1}$, and another line tangent to the base of the transmittance curve. A line is then drawn along the 3500 cm.$^{-1}$ line intersecting the two tangent lines. The value between the two points of intersection is then read off in percent transmittance. This reading is then subtracted from 100% to give the adjusted percent transmittance due just to the hydroxyl function, thereby getting rid of the background transmittance. The adjusted percent of transmittance is then used to calculate the extinction coefficients in the following manner.

$$a(K) = \frac{\log_{10} 1/T}{bc}$$

where:

$a(K)$ = extinction coefficients 1/g.–cm.
$T$ = adjusted percent transmittance/100
$b$ = Cell thickness (cm.)
$c$ = Concentration grams/liter The above calculations are those proposed by the Joint Committee on Nomenclature in Applied Spectroscopy, established by the Society for Applied Spectroscopy and the American Society for Testing Materials, as set forth in its report published in 1952.

Hydroxyl equivalent is used to describe the caustic stable defoamer in that it too is an intensive property of the substances. It is derived also by an infrared spectrophotometric measurement. The same procedure as used for the extinction coefficient is followed up to the point of actually calculating the extinction coefficient. Once the adjusted percent transmittance is found, it is converted to absorbance (optical density) by the following calculation:

$$A = \log_{10} 1/T$$

where:

$A$ = absorbance
$T$ = adjusted percent transmittance/100

Prior to running the absorbance measurement a calibration graph was determined by plotting absorbance against concentration of a known alcohol in carbon tetrachloride solution expressed as millimoles of hydroxyl function/liter. The method of determining the absorbances of the known alcohol is the same as above.

Once the absorbance of the caustic stable defoamer is found, it is then located on the calibration graph and the equivalents of millimole of hydroxyl function/liter is read off. Already knowing the concentration of defoamer used in grams/liter, it is simple calculation to determine the hydroxyl function equivalent in millimoles/gram of sample.

*Evaluation test of surface active-defoaming agents for caustic stability*

A defoaming agent is considered to possess acceptable caustic stability when being mixed with sodium hydroxide in a ratio of about 1 to 10 parts of defoamer to 99 to 90 parts of sodium hydroxide and stored at 110° C. for a period of at least one month it still exhibits acceptable defoaming properties.

Acceptable defoaming properties are defined as the ability of the product to defoam a wash solution of 0.3% sodium hydroxide in the presence of at least 0.2% by weight whole egg soil when the defoamer is added to the wash solution in an amount of from about 1 to 5 percent by weight of the sodium hydroxide present.

Defoaming is considered satisfactory if when employing the above wash solution in the presence of the whole egg soil the pressure in the water circulating system is 40 percent or more of that obtained in the water circulating system with plain water when no soil or caustic is present. A Hobart AM commercial dishwashing machine was employed for the defoaming test. A sample of the defoaming agent is first mixed with flake sodium hydroxide to give a 1% mix which is then stored in a container in a hot box at 110° F. A weighed sample is withdrawn for the test at various intervals. The test itself consists of three different readings off a differential manometer connected to a pitot tube that is inserted into the wash arm of the dishwashing machine. The first pressure reading obtained is for the water alone, the second pressure reading is after the caustic-defoamer mix has been added, and the third pressure reading is taken after the egg food soil has been added.

Utilizing the above test procedure, the defoaming performance of the products of this invention and the base compound from which they are prepared are shown in Table II.

TABLE II

| Defoamer | Time Exposed To Caustic (weeks) | Egg Food Soil | Water Pressure as Compared with Water Alone (percent) |
| --- | --- | --- | --- |
| Average Base Compound Corresponding to Formula B. | 3 | Present | 10.4 |
| Product of Example I | 18 | ___do___ | 64.5 |
| Product of Example II | 13 | ___do___ | 43.2 |
| Product of Example III | 4 | ___do___ | 56.8 |
| Product of Example IV | 3 | ___do___ | 41.4 |

The above test results clearly show the excellent defoaming properties of the compounds of this invention after being admixed with sodium hydroxide and stored at elevated temperatures. As is seen, the new compounds of the invention possess greatly superior defoaming properties in the presence of caustic materials than the base compounds from which they are prepared, which base compounds themselves possess satisfactory surface-active and defoaming properties in the absence of caustic materials.

The subject compounds of the invention are particularly advantageous for use as defoaming agents in detergents containing a high proportion of caustic materials such as sodium hydroxide. The defoaming agents of this invention have excellent surface active and detergent qualities and are valuable for use in commercial mechanical dishwashers, residential dishwashers, clotheswashers, metal cleaning units and dairy pipe cleaning machines. When utilized as surface active and defoaming agents in cleansing compositions containing caustic materials the benzyl ether compounds of this invention are employed in amounts ranging from about one to ten percent by weight of the composition.

Those modifications and equivalents which fall within

We claim:
1. Compounds having the formula

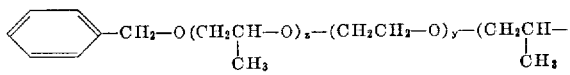—CH$_2$—O(CH$_2$CH—O)$_z$—(CH$_2$CH$_2$—O)$_y$—(CH$_2$CH—O)$_x$—(CH$_2$CH$_2$—O)$_y$—CH$_2$CH—O)$_z$—CH$_2$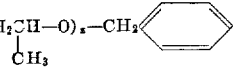
                   CH$_3$                                    CH$_3$                                   CH$_3$ wherein:

$x$ is an integer of such value that the number of oxypropylene groups defined thereby constitutes from about 27 to about 33 percent by weight of the compound;

$y$ is an integer of such value that the number of oxyethylene groups defined thereby constitutes from about 31 to about 41 percent by weight of the compound;

$z$ is an integer of such value that the number of oxypropylene groups defined thereby constitutes from about 27 to about 36 percent by weight of the compound, the values of $x$, $y$ and $z$ being such that the average molecular weight of the compound ranges from about 3800 to about 4700.

2. A compound as defined in claim 1 having an average molecular weight of about 4213.

3. A compound as defined in claim 1 having an average molecular weight of about 3853.

References Cited

UNITED STATES PATENTS

| | | | |
|---|---|---|---|
| 2,596,091 | 5/1952 | Benneville | 252—89 |
| 2,826,552 | 3/1958 | Bonewitz et al. | 252—156 |
| 2,828,265 | 3/1958 | Van Strien. | |
| 2,836,626 | 5/1958 | Hatelid | 260—611 |
| 2,856,434 | 10/1958 | Niederhauser et al. | 260—613 |
| 2,903,485 | 9/1959 | Lane et al. | 260—613 |
| 2,982,739 | 5/1961 | Dvorkovitz et al. | 252—156 |
| 3,048,548 | 8/1962 | Martin et al. | |
| 3,190,926 | 6/1965 | Edwards | 260—613 |
| 3,211,651 | 10/1965 | Elliott et al. | 260—613 X |

LEON ZITVER, *Primary Examiner.*

JULIUS GREENWALD, BERNARD HELFIN,
*Examiners.*

A. T. MEYERS, *Assistant Examiner.*